United States Patent Office 3,029,501
Patented Apr. 17, 1962

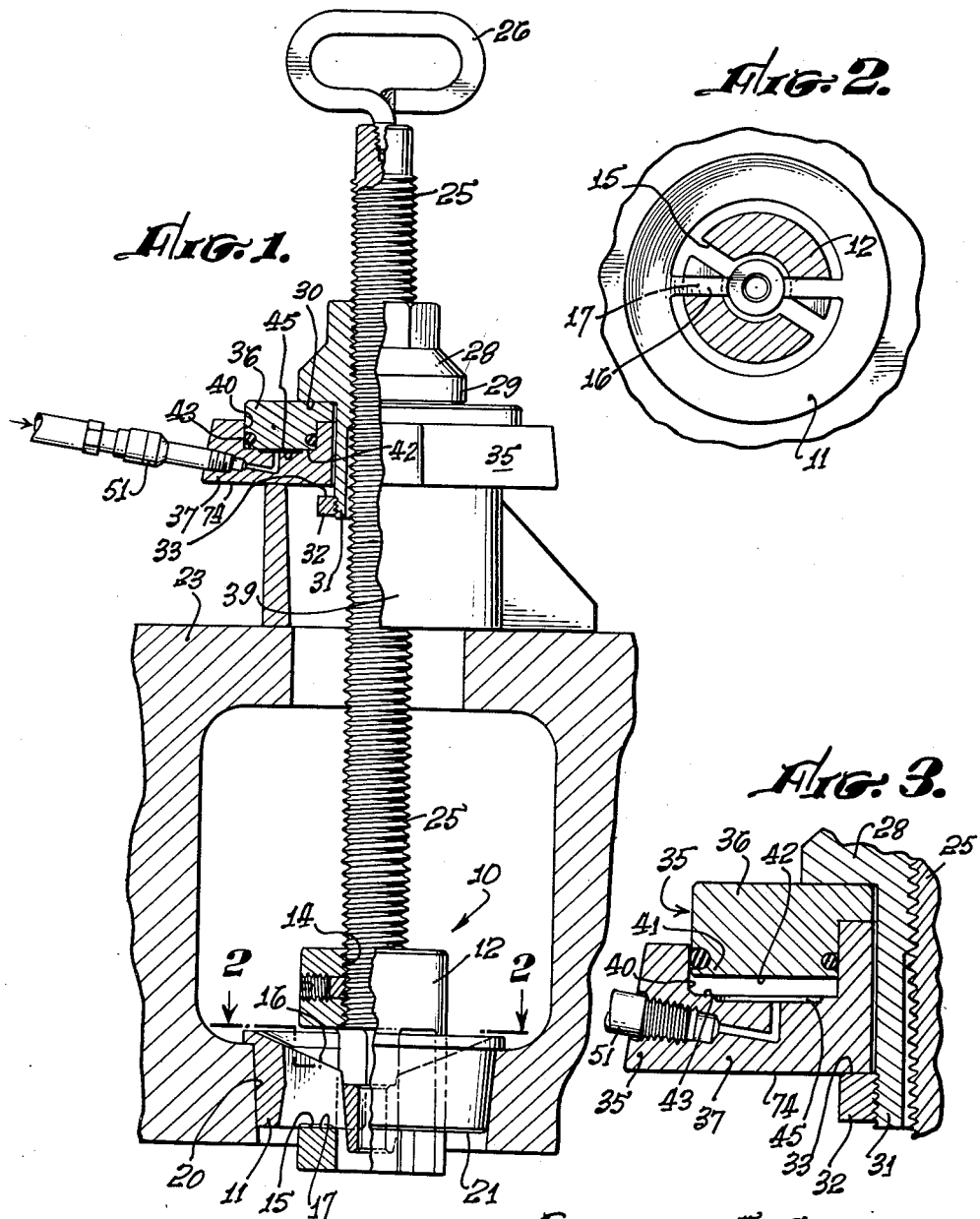

3,029,501
VALVE SEAT PULLER
Clarence H. Leathers, 3010 Johnson Ave., Redondo Beach, Calif.
Filed Sept. 10, 1959, Ser. No. 839,197
2 Claims. (Cl. 29—213)

This invention relates to a device for pulling an insert member from a bore and more particularly to a device for removing valve seats and linings from the bore of a mud pump.

As is well known in the oil producing industry, a slush pump, or mud pump, is used to deliver and circulate drilling fluid under pressure to the drill bit which is operating at the bottom of the well. In the most usual construction a mud pump valve moves into and out of engagement with an annular valve seat which is inserted into a bore of the pump body. Due to the constant operation of the valve and the abrasive character of the drilling fluid the valve and valve seat are subjected to considerable wear and must be replaced. The valve seat is annular in configuration with a slightly tapered outer surface which mates with a similar taper of the surface of the bore. Due to the hammering action of the valve body against the valve seat and the high pressures involved, the tapered seat becomes wedged into the bore. These and additional reasons, such as deformation of the seat and rusting in place, cause removal of the valve seat from the bore of the pump to be very difficult. Although the device of the present invention can be adapted for pulling liners, pistons and other valve pieces from oil-well pump tubing and bores, it is particularly adapted for pulling valve seats from the valve deck of a mud pump as discussed above and will be shown and described in such connection.

Accordingly, it is an object of the present invention to provide an improved device operable from the exterior of a body to engage an insert member in a bore within a body to exert a large force sufficient to remove the insert from the bore.

It is another object of the present invention to provide an insert removal device which includes means for engaging the insert from the exterior of a mud pump and exerting a force in tension to break the insert loose from its wedged position.

Another object of the present invention is to provide an improved valve seat removal device to remove a valve seat from a bore, from a mud pump which exerts a greater and faster removal force than devices heretofore known to the art.

It is a further object of the present invention to provide a valve seat removal device which is adjustable to operate on various mud pumps and which is easily adapted to valve seats or other inserts of various types and configurations.

The present invention is an insert removal device for removing an insert such as a valve seat from a bore in a pump body including an insert engaging means, a mandrel affixed to the insert engaging means extending longitudinally from the bore and longitudinally movable with respect to the bore. A head plate is supported by the body in bearing engagement with the mandrel. Hydraulic means are provided in association with the head plate to exert an hydraulic force to the head plate to cause longitudinal movement of the mandrel in the bore.

The novel features which are believed to be characteristic of the present invention, both as to its organization and method of operation, together with other objects and advantages thereof, will be better understood from the following description considered in connection with the accompanying drawing in which two embodiments of the invention are illustrated by way of example. It is to be expressly understood, however, that the drawing is for the purpose of illustration and description only, and is not intended as a definition of the limits of the invention.

In the drawing:
FIG. 1 is a view in elevation, partly in section, of the valve seat removal device in position on a pump body and in engagement with a valve seat.

FIG. 2 is a plan view taken along line 2—2 of FIG. 1 showing the insert engaging member in engagement with the valve seat; and FIG. 3 is a partially enlarged sectional view of the hydraulic mechanism with a removing force exerted.

Referring now to FIGURE 1, the presently preferred embodiment of this invention is adapted for pulling a valve seat 10 of the center guide bearing type as shown. That is, two types of valve seats are in generally widespread use, the first being the type in which one or more radial spokes or bars extend across the seat to furnish a guide bearing for the valve stem. Such a valve seat is shown, for example, in United States Patent No. 2,178,876 issued November 7, 1939 to J. W. MacClatchie. The second type of valve insert in common use is that in which the seat has an open inner surface with no bars or spokes extending across the seat.

Engaging means for engaging both types of seats are well known to the art and a center guide seat 11 and seat engaging means 12 are shown and described in this application for purposes of illustration only. Thus, the seat engaging member 12 is a generally cylindrical metal body having a threaded bore 14 and an engaging slot 15. The slot 15 extends vertically from the lower surface of the body 12 a sufficient distance to allow the spoke 16 to move well into the body. A substantially horizontal shoulder 17 is provided proximate the lower surface of the body by widening the slot at that point to form a generally J-shaped slot. That is, the slot is so formed that the engaging body 12 can be placed downward into the pump bore 20 and over the spoke 16 of the valve seat. The spoke moves into the slot after which the engaging body 12 is rotated a partial turn to engage the lower edge of the spoke. For valve seats having no spoke, an engaging body of the type well known to the art for engaging the lower edge 21 of the seat is used.

As shown in the drawing and particularly FIGURE 1, the bore 20 in the valve deck 22 is tapered and is coextensive with the bore through the pump body 23. The bore of the valve deck and the remainder of the pump body are hereinafter referred to as the bore of the pump. It will be seen that the continual downward pounding of the valve against the valve seat will cause the seat to be tightly wedged into the bore.

A mandrel 25 is threaded into connection with the engaging body 12 and extends longitudinally upward through the pump bore 20 to a substantial distance above the pump body. A handle 26 may be affixed to the outer end of the mandrel for ease of manipulation. The mandrel is male threaded along a substantial portion of its length from the outer end thereof. The extent of the threads being such that they extend from the outer end of the mandrel to a position below the upper surface of the pump body.

An elongated nut 28 is internally threaded and mateable with the mandrel 25 for longitudinal threaded engagement therewith. A circumferential protrusion 29 is provided on the nut 28 and has an outside diameter substantially greater than the diameter of the elongate section 31 of the nut 28. The elongate section 31 is of circular cross-section in this embodiment while a plurality of flats are provided on the exterior of the nut above the protrusion 29 for turning the nut upon the mandrel.

The nut 28 is male threaded proximate the lower end thereof and a movement limiting nut 32 is threadably connected thereto in order to provide a movement limiting shoulder 33. Thus, an elongate section 31 of the nut 28 is defined between the circumferential shoulders 30 and 33.

A head plate 35 is positioned surrounding the elongate section 31 of the nut 28 between the shoulders, 30 and 33 when the movement limiting nut 32 is connected to the elongate nut 28.

A head plate 35 is made up of a top plate section 36 and a lower plate section 37. The lower plate has an outside diameter sufficient to span the bore 20 of the pump body 23. The top plate 36 and lower plate 37 are substantially equal in inside diameter, which diameter is substantially equal to but greater than the diameter of the elongate section 31 of the nut 28. It should be noted that although the head plate is described in this embodiment as being circular with a circular inside diameter corresponding to the circular cross section of the elongate section 31, other suitable configurations may be employed.

Although the head plate 35 can be positioned in direct bearing contact with the pump body and surrounding the bore 20 of the body, it is sometimes advantageous to utilize a bearing sleeve to space the head plate from the pump body. Such a bearing sleeve 39 is shown in FIGURE 1 and is merely a spacer sleeve between the pump body and the head plate.

Referring particularly to FIGURE 1, the top plate 36 and the lower plate 37 are mateable such that they are movable longitudinally with respect to each other. That is, in this embodiment a circumferential groove 40 is provided in the upper surface of the lower plate and is of a predetermined depth and a predetermined inside and outside diameter. A mateable circumferential protrusion 41 is provided on the lower surface of the top plate. The circumferential protrusion has an inside and outside diameter substantially equal to those of the circumferential groove 40 and has a length slightly less than the predetermined depth of the circumferential groove 40 in the upper surface of the lower plate 37. That is, as shown in FIGURE 1 the top plate and lower plate are mateable such that when the lower surface 42 of the top plate 36 is in contact with the upper surface 43 of the lower plate, the protrusion 41 extends into the groove 40 but does not extend to the surface thereof. Thus, a circumferential chamber is defined between the top plate 36 and the lower plate 37 and the top and lower plates are longitudinally movable with respect to each other to allow expansion in volume of the circumferential chamber 45.

As shown particularly in FIGURES 1 and 3 an hydraulic path 33 is defined through the lower plate 37 communicating the circumferential chamber 45 with the exterior of the plate. In the embodiment shown the path extends from the outer diametrical surface of the lower plate 37 inward radially and then upward to the bottom surface of the circumferential chamber 45.

Proximate the outer portion of the hydraulic path a female threaded opening is provided coextensive with the path. A male threaded flanged nipple 51 is threadably connected into the female opening in the lower plate 37. The nipple 51 serves as a connector for an hydraulic line which is in turn connected to a source of hydraulic pressure which source is not shown in the drawing. The source may be of any type well known to the art and in the present embodiment a grease gun of the conventional type is used. The nipple 51 for use with a grease gun can, for instance be a typical grease fitting which is threaded into mating engagement with the bottom plate 37.

Thus, in operation, in order to remove a valve seat from the pump body the separable head plate 35 is positioned upon the elongate nut 28. The movement limiting nut 32 is then threaded on to the elongate nut 28 and the head plate is thus positioned surrounding the elongate portion 31 of the nut 28. With the seat engaging member 12 positioned along the lower end of the mandrel 25 the seat removal device is lowered into the pump body shown in FIGURE 1, until the slot 15 of the seat engaging member 12 moves past the spoke 16 in the valve seat 12. By turning the assembly a partial turn the valve seat is engaged by the shoulder 17 of the seat engaging member 12 as described hereinbefore. The elongate nut is then turned downward on the mandrel 25 until the lower surface 74 of the lower plate 37 comes to rest upon the pump body 23, or spacer 39 surrounding the bore 20. The elongate nut 28 is further turned down until all slackness is removed from the removal apparatus by pulling the horizontal shoulder 17 into firm contact with the spoke 16 to bring the shoulder 30 into firm engagement with the upper surface of the top plate 36. The grease gun or other source of hydraulic pressure is then connected to the nipple 51.

It may now be seen that all contact surfaces of the device are in firm assembly and that any upward motion of the mandrel must exert an upward movement on the valve seat 11. Further the hydraulic chamber 45 is defined by the top and lower plates 36 and 37 respectively. To remove the valve seat, fluid under pressure is forced through the connecting path and into the circumferential chamber 45. As the fluid under pressure moves into the circumferential chamber, a pressure of high magnitude is exerted within the chamber to cause the top plate 36 to be moved away from the bottom plate 37. Since the top plate is forced upward in FIGURE 1 it exerts an upward force upon the mandrel through the shoulder 30 and causes the mandrel 25 to pull the valve seat out of the bore of the valve deck with considerable force. The upward movement of the top plate 36 and mandrel 25 is limited by the shoulder 33 of the movement limiting nut 32.

Thus, what has been described is a device which utilizes hydraulic forces to remove an insert such as a valve seat from a bore in a mud pump body. The removal forces obtained by the present device are considerable and are sufficient to remove the most tightly wedged valve seat from the valve deck bore with a maximum of efficiency and ease of operation.

What is claimed is:

1. An insert removal device for removing an insert from a longitudinally extending bore within a body comprising: means adapted to engage the insert; a longitudinally extending threaded mandrel, said mandrel affixed at one end thereof to said engaging means; an elongate threaded member threadably engaged on said mandrel and spaced from said engaging means, said elongate member defining a first transverse shoulder facing toward said one end of said mandrel, said first shoulder having a substantially greater diameter than said mandrel, said elongate member including an elongate cylindrical section extending from said first shoulder toward said one end of said mandrel, the outside diameter of said elongate cylindrical section being greater than the diameter of said mandrel and substantially less than the diameter of said first shoulder, said elongate member defining a second transverse shoulder facing toward said first shoulder and spaced a predetermined longitudinal distance therefrom; a longitudinally separable head plate positioned between said first and second shoulders and surrounding said elongate section, said head plate being longitudinally movable with respect to said elongate section, said head plate including an upper plate in bearing contact with said first shoulder and a lower plate adapted to be engaged in transverse bearing contact with said body such that said lower plate is a stationary plate when so engaged; said lower plate having an upper transverse surface, said surface defining a circumferential groove extending longitudinally downward therefrom, said upper plate having a lower transverse surface, a circumferential protrusion extending downwardly from said surface, said protrusion being mateable with said groove, and hydraulic inlet means through said head plate to said groove for inserting fluid under pressure between said groove and said protrusion to separate longitudinally said upper and lower plates.

2. An insert removal device for removing an insert from a longitudinally extending bore within a body comprising: means adapted to engage the insert; a longitudinally extending threaded mandrel, said mandrel affixed at one end thereof to said engaging means; an elongate threaded member threadably engaged on said mandrel and spaced from said engaging means, said elongate member defining a first transverse shoulder facing toward said one end of said mandrel, said first shoulder having a substantially greater diameter than said mandrel, said elongate member including an elongate cylindrical section extending from said first shoulder toward said one end of said mandrel, the outside diameter of said elongate cylindrical section being greater than the diameter of said mandrel and substantially less than the diameter of said first shoulder, said elongate member defining a second transverse shoulder facing toward said first shoulder and spaced a predetermined longitudinal distance therefrom; a longitudinally separable head plate positioned between said first and second shoulders and surrounding said elongate section, said head plate being longitudinally movable with respect to said elongate section, said head plate including an upper plate in bearing contact with said first shoulder and a lower plate adapted to be engaged in transverse bearing contact with said body such that said lower plate is a stationary plate when so engaged; said lower plate having a width greater that the diameter of said bore, said lower plate having an upper transverse surface, said lower plate defining a circumferential groove extending from said upper surface downwardly, said groove having substantially parallel sides extending vertically from said surface, said upper plate having a lower transverse surface, a circumferential protrusion extending downwardly from said surface, said protrusion having vertically extending sides and being mateable with said groove, and hydraulic inlet means through said head plate to said groove for inserting fluid under pressure between said groove and said protrusion to separate longitudinally said upper and lower plates.

References Cited in the file of this patent

UNITED STATES PATENTS

| | | |
|---|---|---|
| 1,454,088 | Thrift | May 8, 1923 |
| 1,726,187 | Mahan | Aug. 27, 1929 |
| 2,430,100 | Brumder et al. | Nov. 4, 1947 |
| 2,475,040 | Mandl | July 5, 1949 |
| 2,571,265 | Leufren | Oct. 16, 1951 |
| 2,866,370 | Biach | Dec. 30, 1958 |
| 2,885,919 | Carlson | May 12, 1959 |
| 2,959,258 | Hagemann | Nov. 8, 1960 |